United States Patent [19]

Kitamura

[11] 4,412,162
[45] Oct. 25, 1983

[54] PROTECTIVE SYSTEM FOR AUTOMATIC TOOL CHANGING APPARATUS

[75] Inventor: Koichiro Kitamura, Takaoka, Japan

[73] Assignee: Kitamura Machinery Co., Ltd., Takaoka, Japan

[21] Appl. No.: 348,306

[22] Filed: Feb. 12, 1982

[30] Foreign Application Priority Data

Feb. 26, 1981 [JP] Japan .................. 56-26127

[51] Int. Cl.³ ........................... G05B 9/02
[52] U.S. Cl. ................... 318/563; 318/434; 318/476; 318/484; 361/29
[58] Field of Search ........... 318/434, 484, 476, 452, 318/563; 361/31, 28, 29

[56] References Cited

U.S. PATENT DOCUMENTS

| 3,248,629 | 4/1966 | Reynolds ........... 318/434 X |
| 3,248,985 | 5/1966 | Hitchcock et al. ........ 318/434 X |
| 3,477,007 | 11/1969 | Du Commun et al. ....... 318/484 X |
| 4,156,162 | 5/1979 | Warfield et al. ............ 318/434 |
| 4,322,668 | 3/1982 | Trussler et al. ............ 318/476 X |

FOREIGN PATENT DOCUMENTS 30416  6/1981  European Pat. Off. .......... 318/434

Primary Examiner—B. Dobeck
Attorney, Agent, or Firm—Fleit, Jacobson, Cohn & Price

[57] ABSTRACT

There is disclosed a protective system for preventing damages to a tool and a work or tool changing mechanism component parts due to any interference between the tool and the work during the tool changing operation by an automatic tool changing apparatus in a numerical control machine tool such as a machining center.

The protective system monitors the load current of a driving motor for the automatic tool changing apparatus, whereby when the load current reaches an abnormally high current value during the operating period excluding the motor starting period, the operation of the automatic tool changing apparatus is reversed and then stopped.

4 Claims, 2 Drawing Figures

PROTECTIVE SYSTEM FOR AUTOMATIC TOOL CHANGING APPARATUS

BACKGROUND OF THE INVENTION

The present invention relates to a protective system for preventing damages to the tools, work, tool changing apparatus mechanisms, etc., due to any mechanical interference during the tool changing by an automatic tool changing apparatus in a numerical control machine tool such as a machining center.

There is known in the prior art an automatic tool changing apparatus which is well suited for use with machining centers, that is, an automatic tool changing apparatus which is capable of holding a large number of tools, adapted to effect the changing of tools at the nearest possible position such that the changing of the tools does not interfere with the work and capable of effecting the tool changing at a high speed. With this apparatus, a series of tool changing cyclic operations consisting of moving a tool mounted on the spindle of a head for machining a work relative to a magazine holding a large number of replacement tools to detach the tool from the socket of the spindle (lowering of the magazine), moving the arms within the magazine thereby positioning a new tool just below the socket in place of the used tool and raising the magazine thereby fitting the new tool in the socket is accomplished in several to several tens seconds. In a machining center equipped with such an automatic tool changing apparatus, however, closer the magazine is positioned to the work so as to reduce the tool changing time greater will become the danger of causing the tools and the work to interfere with each other during the tool changing, and moreover depending on the size and shape of the work the same tool changing position causes such an interference for some types of tools. As a result, there has arisen an additional problem to be solved, that is, the problem of such an interference between a tool and a work during the tool changing with the resulting damage to the tool or the work and hence to the automatic tool changing apparatus itself.

SUMMARY OF THE INVENTION

It is the primary object of the present invention to overcome the foregoing deficiencies in the prior art, and more particularly it is an object of the invention to provide a protective system so designed that when an interference is caused between a tool and a work during the tool changing operation, the interference is detected within the automatic tool changing apparatus so that the tool changing operation is immediately reversed and then stopped.

In accordance with the present invention there is thus provided a protective system for preventing an interference between a tool and a work during the tool changing operation in an automatic tool changing apparatus which performs a series of tool changing cyclic operations by a driving electric motor, such as, lowering the tool magazine, selecting a tool and raising the magazine between the machining head spindle socket and the tool magazine of the machine tool, and the protective system comprises a current detecting circuit for detecting the load current of the driving electric motor, a first comparator circuit for generating an output when the current detecting circuit detects a current higher than a warning current value preset to a current level higher than the maximum steady-state load current value of the motor, a second comparator circuit for generating an output when the current detecting circuit detects a current which is higher than an irregularity protective current value preset to another current level higher than the first current level, a timer circuit for preventing the application of the detection output of the current detection circuit to the first and second comparators over a predetermined time during the starting period until the load current is stabilized at the steady-state value after the starting of the motor, a warning relay unit operable in response to an output from the first comparator circuit to give an overload warning, and a protective-action relay unit operable in response to an output from the second comparator circuit and an actuation signal from the warning relay unit to reverse the direction of rotation of the motor thereupon.

With this protective system according to the invention, in association with the series of automatic cyclic control operations of an automatic tool changing apparatus itself, if for example, an interference occurs between the work and the used tool when the latter is being detached from the spindle socket, the interference is immediately detected so that the tool is brought back into the spindle socket and the tool changing is stopped, whereas when an interference occurs between the work and a new tool in the course of the latter being transferred from the magazine to the spindle socket, the interference is immediately detected so that the new tool is returned to the magazine and the tool changing is stopped. During the interval a warning is given continuously and the tool changing operation cannot be proceeded unless the protective system is reset.

The above and other constructions and features of this invention will become more apparent from the following detailed description taken in conjunction with the accompanying drawings.

DESCRIPTION OF THE PREFERRED EMBODIMENTS

In accordance with the invention, the occurrence of an interference between a tool and a work during the tool changing operation is detected by monitoring the load current of a driving electric motor of an automatic tool changing apparatus.

Figure 1:
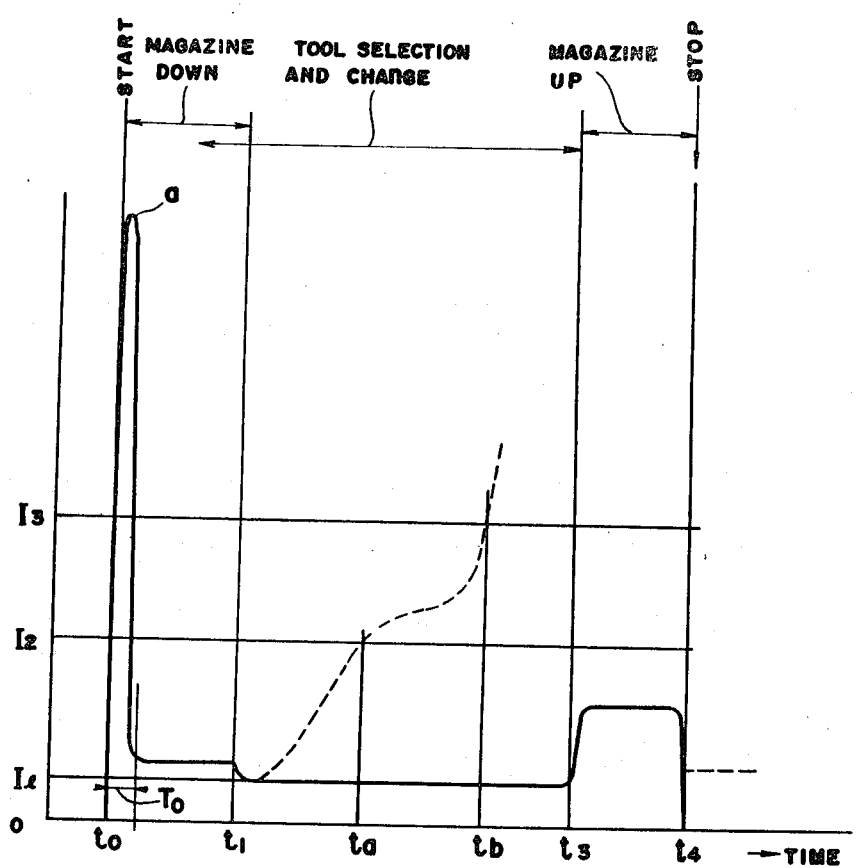
FIG. 1 is a diagram showing variation of the load current during the operating cycle of a driving motor of an automatic tool changing apparatus.

The pattern of variation in the load current of the driving motor during each cycle of tool changing operation exhibits a fixed pattern as shown in FIG. 1. More particularly, in FIG. 1, when a command is applied to the automatic tool changing apparatus at a time $t_o$ so that the driving motor comes into operation, a starting current which is ten odd times a steady-state load current Il causes a peak a during an interval To determined by the inherent characteristics of the apparatus and then the required load current for lowering the magazine flows in an amount which is slightly greater than the steady-state load current Il. During the interval, the reception of the used tool and the selection of a new tool are started on the magazine side so that when the lowering of the magazine to a predetermined height position is completed at a time t1, the load current is stabilized at the rated value I1 and the operation of changing the used tool in the socket of the machining head spindle with the new tool is effected. Then, upon completion of the tool changing operation at a time t3, the magazine is raised and returned to the original position and a load current flows whose value is about two times that of I1. One cycle of the tool changing operation is completed at a time t4 so that the apparatus is stopped or the next cycle of the changing operation is started.

When the tool interferes with the work, the load current begins to increase as shown by the broken line in FIG. 1 so that a current of more than several times the rated value flows and a so-called overload condition occurs. As a result, in accordance with the invention the level of such overload current is monitored during the tool changing cycle excluding the interval To so that any interference of the tool is rapidly detected without providing a separate detector in the vicinity of the machining head or the magazine or without providing any additional thing in the work machining space and the driving motor is reversed to reverse the sequence of the series of the automatic tool changing operations. The operation after the reversal is stopped by the action of the sequence itself at a time or position determined by the sequence.

In FIG. 1, designated at I2 is a warning current level which is preset so as to detect and give a warning that the load current has risen over the maximum current value (the current value during the interval t3 to t4) during the operating cycle excluding the starting period to about three times the rated value, for example, and I3 an irregularity protection current value preset so as to effect a protective operation upon detection that the load current has risen to about five times the rated value.

Figure 2:
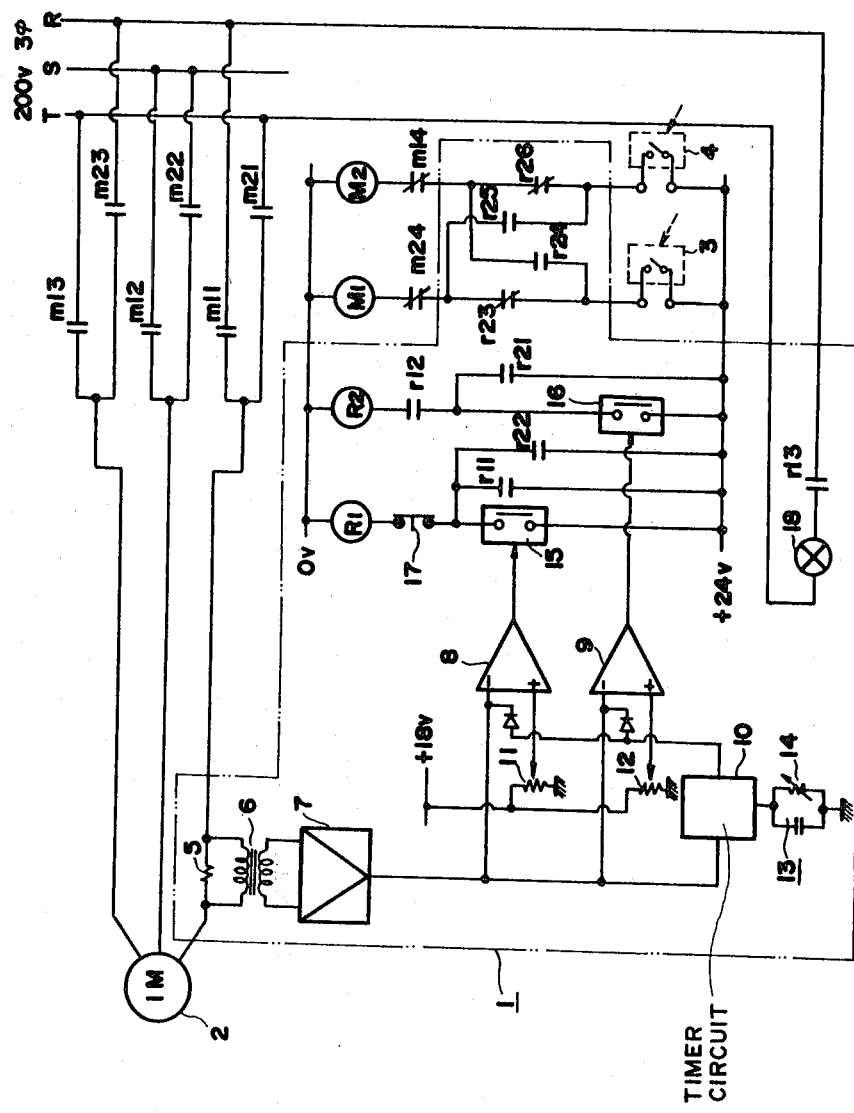
FIG. 2 is a circuit block diagram showing an embodiment of the invention.

FIG. 2 shows the protective system of this invention which is designated at a reference numeral 1 and enclosed by the dot-and-dash line as well as the driving motor 2 and its forward/reverse switching circuit section.

The forward/reverse switching circuit section of the driving motor 2 is incorporated in the automatic tool changing apparatus itself and it comprises switch means 3 adapted to be turned on in response to the application of a forward running command from a tool changing automatic control unit, switch means 4 adapted to be turned on in response to a reversing command from the automatic control unit, a forward relay M1 adapted to be energized by the turning on of the switch means 3, a reversing relay M2 adapted to be energized by the turning on of the switch means 4, normally open contacts m11, m12 and m13 of the relay M1 and normally open contacts m21, m22 and m23 of the relay M2, thereby connecting the respective phases T, S and R of a three-phase ac power supply to the motor 2 for forward and reverse running purposes. A normally closed contact m14 of the relay M1 and a normally closed contact m24 of the relay M2 are each provided as an interlocking contact for the partner relay.

In the protective system of this invention, the armature current of the motor 2 is detected in arbitrarily selected one of the three phases so as to monitor the level of the load current. More specifically, a resistor 5 is inserted in series in the armature circuit for a given phase of the motor 2 so that the voltage drop across the resistor 5 is isolated by a transformer 6, stepped up to a suitable level and then detected, thereby taking the load current as a voltage signal. The secondary output of the transformer 6 is converted to a dc voltage level signal in a rectifier/dc amplifier 7 and then the signal is supplied to a first comparator circuit 8, a second comparator circuit 9 and a timer circuit 10, respectively. Each of the first and second comparator circuits 8 and 9 generates an output when said input dc voltage level signal exceeds a reference potential preset by a potentiometer 11 or 12. The potentiometer 11 is preset in correspondence to the warning current value level I2 of FIG. 1 and the potentiometer 12 is preset similarly in correspondence to the irregularity protection current value level I3 of FIG. 1. The timer circuit 10 is designed so that only during the time that the output of the amplifier 7 rises from zero, the inputs to the comparator circuits 8 and 9 are cut off for a time interval preset by a potentiometer 14 of a time constant circuit 13 so that the signal from the amplifier 7 is prevented from being applied to the comparators 8 and 9. The time interval preset by the potentiometer 14 of the time constant circuit 13 may be sufficient if it is slightly longer than the interval To during the starting period.

The first comparator circuit 8 generates an output to turn on switching means 15 and the second comparator circuit 9 generates an output to turn on another switching means 16. Each of the switching means 15 and 16 comprises a contactless relay such as a transistor or thyristor or a contact type relay of the electromagnet type.

The switching means 15 forms, along with a reset switch 17 and a warning relay R1, a series circuit which in turn is connected across the ends of a control power supply, and the switching means 16 form, along with a normally open contact r12 of a relay R1 and the protecting relay R2, a series circuit which in turn is connected similarly across the ends of the control power supply. In other words, the switching means 15 and the relay R1 form a warning relay unit, and the switching means 16 and the relay R2 form a protective action relay unit. Numeral r11 designates a self-holding normally open contact of the relay R1, r21 a self-holding normally open contact of the relay R2, and r22 a normally open contact of the relay R2 for holding the operation of the relay R1.

The relay R1 incudes another normally open contact r13, and an alarm 18 comprising a warning light or warning buzzer is provided to give a warning when the contact r13 is closed.

On the other hand, the relay R2 further includes two normally closed contacts r23 and r26 and two normally open contacts r24 and r25, and these contacts r23, r24, r25 and r26 change the connections between the switch means 3 and 4 and the relays M1 and M2. In other words, with the relay M1 being energized by the application of a forward running command to the switch means 3, if the relay R2 is operated, the relay M1 is deenergized and the relay M2 is energized. On the other hand, with the relay M2 being energized by the application of a reversing command to the switch means 4, if the relay R2 is operated, the relay M2 is deenergized and the relay M1 is energized. In this way, the motor 2 is reversed when the relay R2 is operated so that the sequence of the automatic tool changing apparatus itself is reversed and thus it is stopped at a predetermined time or position.

As having been described hereinabove, in accordance with the automatic tool changing apparatus protective system of this invention the load current of the driving motor of the automatic tool changing apparatus is monitored so that an overload warning indicative of an excessive tool weight, running out of the lubricating oil or the like is given first when the warning current level I2 is exceeded. If the load current still rises so that the current level I3 is exceeded, the interference between the tool and the work is detected as a locking phenomenon of the motor so that in accordance with the result of the detection the motor is reversed to move the tool away from the work and then an emergency stop is effected. This emergency stop condition is maintained as such until its cause is eliminated and then the reset switch 17 is opened. Further, the current levels I2 and I3 are separately adjustable by the potentiometers 11 and 12 and thus the system can produce many effects if it is incorporated as an option in an automatic tool changing apparatus of a machining center.

What is claimed is:

1. A protective system for automatic tool changing apparatus which provides protection against an interference between a tool and a work during the tool changing operation by an automatic tool changing apparatus for a machine tool which performes through a driving electric motor a series of tool changing cyclic operations including lowering and raising of a tool magazine, etc., between a socket of a machining head spindle and the tool magazine, said protective system comprising:

a current detecting circuit for detecting a load current of said driving motor;

a first comparator circuit for generating an output when said current detecting circuit detects a current which is greater than a warning current value preset to a current level greater than a maximum steady-state load current value of said motor;

a second comparator circuit for generating an output when said current detecting circuit detects a current which is greater than an irregularity protection current value preset to a second current level higher than said first current level;

a timer circuit for preventing a detection output of said current detecting circuit from being applied to said comparator circuits for a predetermined time interval during a starting period between the starting of said motor and a time that said load current is stabilized at a steady-state value;

warning relay means operable in response to an output of said first comparator circuit to give an overload warning; and protective action relay means operable in response to an output of said second comparator circuit and an actuation signal from said warning relay means to reverse the direction of rotation of said driving motor thereupon.

2. A protective system according to claim 1, wherein said current detecting circuit comprises a resistor connected in series with an armature circuit of said motor, and means for detecting a voltage drop across the ends of said resistor.

3. A protective system according to claim 1, wherein said first comparator circuit comprises a reference potential setting first potentiometer, wherein said second comparator circuit comprises a reference potential setting second potentiometer, and wherein said first and second comparator circuits respectively generate an output when input potentials thereof exceed reference potentials preset by said first and second potentiometers, respectively.

4. A protective system according to claim 1, wherein said timer circuit comprises a time constant circuit, whereby inputs to said first and second comparator circuits are cut off by said timer circuit for a time interval preset into said time constant circuit only during a time that the output of said current detecting circuit rises from zero.

* * * * *